United States Patent
Nakahama et al.

(10) Patent No.: US 7,754,000 B2
(45) Date of Patent: Jul. 13, 2010

(54) PREPARATION PROCESS OF PIGMENT DISPERSION, IMAGE FORMING PROCESS AND IMAGE FORMING APPARATUS

(75) Inventors: Kazumichi Nakahama, Tokyo (JP); Takayuki Teshima, Yokohama (JP); Yukio Hanyu, Isehara (JP); Ryuji Higashi, Kawasaki (JP)

(73) Assignee: Canon Kabushiki Kaisha, Tokyo (JP)

( * ) Notice: Subject to any disclaimer, the term of this patent is extended or adjusted under 35 U.S.C. 154(b) by 689 days.

(21) Appl. No.: 11/670,236

(22) Filed: Feb. 1, 2007

(65) Prior Publication Data
US 2007/0119336 A1    May 31, 2007

(30) Foreign Application Priority Data
Feb. 28, 2006  (JP) .............................. 2006-053939

(51) Int. Cl.
*C09D 11/00* (2006.01)
(52) U.S. Cl. .................... 106/31.6; 106/31.78; 106/410
(58) Field of Classification Search .................... 106/31
See application file for complete search history.

(56) References Cited

U.S. PATENT DOCUMENTS

| | | | |
|---|---|---|---|
| 4,313,124 A | 1/1982 | Hara | 347/57 |
| 4,345,262 A | 8/1982 | Shirato et al. | 347/10 |
| 4,459,600 A | 7/1984 | Sato et al. | 347/47 |
| 4,463,359 A | 7/1984 | Ayata et al. | 347/56 |
| 4,558,333 A | 12/1985 | Sugitani et al. | 347/65 |
| 4,723,129 A | 2/1988 | Endo et al. | 347/56 |
| 4,740,796 A | 4/1988 | Endo et al. | 347/56 |
| 5,085,698 A | 2/1992 | Ma et al. | 524/388 |
| 2005/0131102 A1 | 6/2005 | Nakazawa et al. | 523/160 |
| 2005/0140765 A1* | 6/2005 | Masumi et al. | 347/102 |
| 2005/0197424 A1 | 9/2005 | Higashi et al. | 523/160 |
| 2005/0239918 A1 | 10/2005 | Nakazawa et al. | 523/160 |
| 2005/0249925 A1 | 11/2005 | Ikegami et al. | 428/195.1 |
| 2006/0004124 A1 | 1/2006 | Tsubaki et al. | 523/160 |
| 2006/0047015 A1 | 3/2006 | Duda et al. | 523/160 |
| 2006/0100310 A1 | 5/2006 | Nakazawa et al. | 523/160 |
| 2006/0128828 A1 | 6/2006 | Sato et al. | 523/160 |
| 2006/0144287 A1 | 7/2006 | Tsubaki et al. | 106/31.13 |
| 2006/0146087 A1 | 7/2006 | Sato et al. | 347/21 |
| 2006/0160975 A1 | 7/2006 | Suda et al. | 526/330 |
| 2006/0178468 A1 | 8/2006 | Sato et al. | 524/556 |
| 2006/0221117 A1 | 10/2006 | Sato et al. | 347/21 |
| 2006/0235177 A1 | 10/2006 | Ikegami et al. | 526/287 |
| 2007/0015856 A1 | 1/2007 | Sato et al. | 524/80 |
| 2007/0069183 A1 | 3/2007 | Sato et al. | 252/500 |
| 2007/0119336 A1 | 5/2007 | Nakahama et al. | 106/31.6 |
| 2007/0149651 A1 | 6/2007 | Teshima et al. | 523/315 |
| 2007/0172589 A1 | 7/2007 | Teshima et al. | 427/212 |

FOREIGN PATENT DOCUMENTS

| | | | |
|---|---|---|---|
| JP | 59-123670 | | 7/1984 |
| JP | 59-138461 | | 8/1984 |
| JP | 64-063185 | | 3/1989 |
| JP | 10-110111 | | 4/1998 |
| JP | 2000-026774 | * | 1/2000 |
| JP | 2001-262023 | | 9/2001 |
| JP | 2004-043776 | | 2/2004 |

* cited by examiner

*Primary Examiner*—Melvin C Mayes
*Assistant Examiner*—Yun Qian
(74) *Attorney, Agent, or Firm*—Fitzpatrick, Cella, Harper & Scinto

(57) ABSTRACT

A process for preparing a pigment dispersion, which comprises mixing a first solvent composed of an organic solvent in which a pigment has been dissolved with a second solvent which lowers the solubility of the pigment in the presence of a dispersant, thereby precipitating and dispersing particles of the pigment in a mixed solvent, wherein a pigment derivative to which a hydrophobic substituent having affinity for the first solvent has been bonded is used as the pigment.

6 Claims, 1 Drawing Sheet

FIGURE
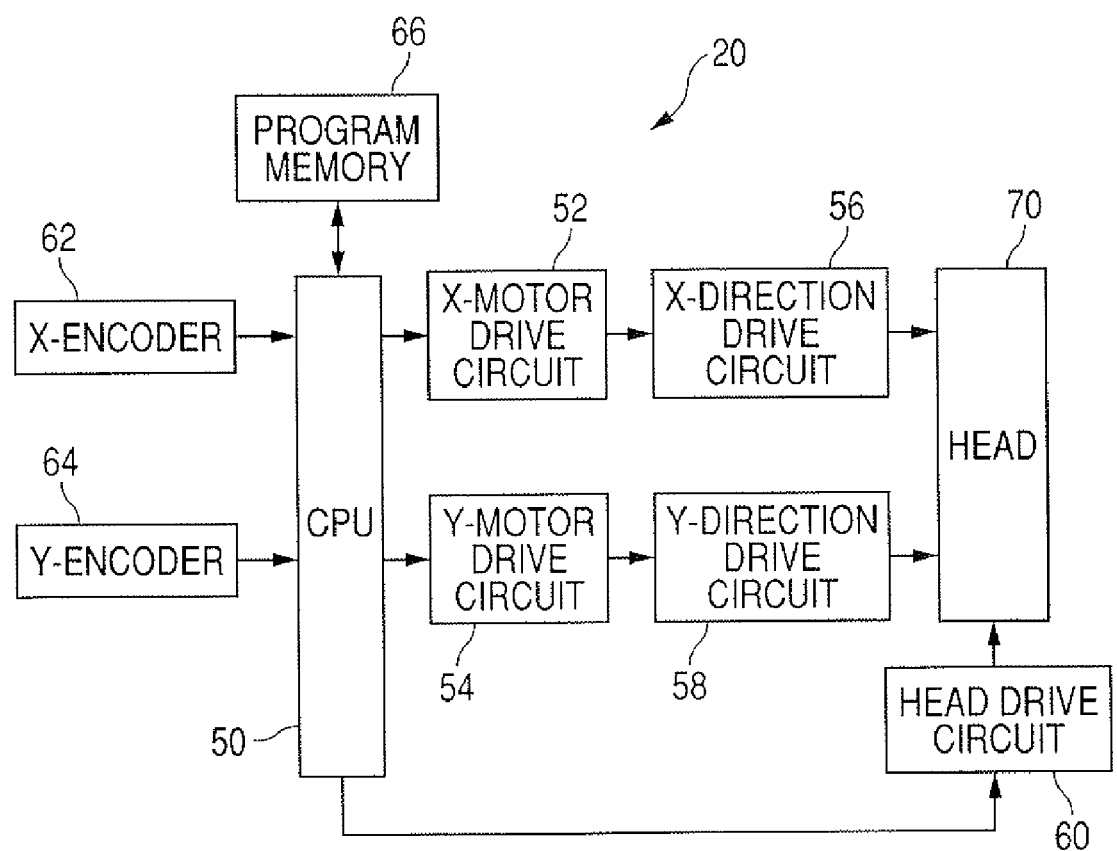

PREPARATION PROCESS OF PIGMENT DISPERSION, IMAGE FORMING PROCESS AND IMAGE FORMING APPARATUS

BACKGROUND OF THE INVENTION

1. Field of the Invention

The present invention relates to a preparation process of a pigment dispersion useful as an ink-jet ink, and to an image forming process and an image forming apparatus using a liquid composition containing the pigment dispersion.

2. Description of the Related Art

In recent years, the digital printing technology has vigorously progressed. Typical examples of this digital printing technology include those called electrophotographic technology and ink jet technology, and its importance as image forming technology in offices, homes and the like has increased more and more in recent years.

Among these, the ink jet technology has a great feature of compactness and low power consumption as a direct recording method.

The formation of higher-quality images is also quickly advanced by formation of micro-nozzles or the like. An example of the ink jet technology includes a method in which an ink fed from an ink tank is evaporated and bubbled by heating it by a heater in a nozzle, thereby ejecting the ink to form an image on a recording medium.

Another example includes a method in which an ink is ejected from a nozzle by vibrating a piezoelectric element.

Water-soluble dye inks have been applied to these methods to date, but have involved problems of bleeding, feathering, poor weatherability and the like.

In order to solve these problems, it has been investigated in recent years to use pigment inks (see U.S. Pat. No. 5,085, 698). In fact, ink-jet inks containing a pigment dispersion in their ink compositions also begin to spread.

However, the pigment inks are often poor in long-term storage stability and ejection stability from an ink jet head as compared with dye inks. In addition, images formed with pigment inks generally tend to be low in color developability compared with images formed with dye inks because they undergo light scattering and/or light reflection by the influence of pigment particles.

As a method for improving the color developability of pigment inks, it has been attempted to pulverize pigment particles. A pigment pulverized to 10 nm or smaller (hereinafter referred to as "fine pigment particles") is less influenced by light scattering and has an increased specific surface area and is thus expected to achieve color developability comparable with that of dyes.

The pulverization of pigment particles is generally mechanically conducted by means of a dispersing machine such as a sand mill, roll mill or ball mill.

In these methods, the pulverization of the pigment is limited to approximately primary particles (about 100 nm), and so it takes a lot of time and cost for further pulverization. In addition, it is difficult to stably provide those having uniform quality (Japanese Patent Application Laid-Open No. H10-110111).

On the other hand, there has been proposed a method for preparing fine pigment particles by dissolving a pigment and then reprecipitating it.

Japanese Patent Application Laid-Open No. 2004-043776 discloses that an organic pigment and a water-soluble dispersant are dissolved in an aprotic solvent in the presence of an alkali, and this solution is then mixed with water to adjust fine pigment particles excellent in dispersion stability.

When copper phthalocyanine that is a typical cyan pigment is applied to this process, however, the solubility of copper phthalocyanine in the aprotic solvent in the presence of the alkali is low. The process has thus involved a problem that it is hard to make high the concentration of pigment derivative particles contained in the resulting liquid composition.

Japanese Patent Application Laid-Open No. 2001-262023 discloses a method for preparing a pigment with improved wettability and compatibility with respect to paper, cloth and the like. In this method, a copper phthalocyanine derivative obtained by introducing a hydrophilic substituent into copper phthalocyanine is dissolved in a supercritical solvent, and the substituent is partially eliminated from this derivative, thereby insolubilizing copper phthalocyanine to form particles. According to this process, copper phthalocyanine and the copper phthalocyanine derivative are said to be provided in a state mixed with each other.

However, this process has involved a problem that since it is essentially difficult to cause a dispersant to intervene in the process of forming the particles, it is extremely difficult to prepare fine pigment particles in a dispersed state.

SUMMARY OF THE INVENTION

The present invention has been made in view of the foregoing circumstances to provide a preparation process of a pigment dispersion containing fine particles of a phthalocyanine pigment derivative, which have high size uniformity and are of the order of nanometer, at a high concentration and in a dispersed state.

The preparation process of the pigment dispersion provided by the present invention is a process for preparing a pigment dispersion, which comprises mixing a first solvent composed of an organic solvent in which a pigment has been dissolved with a second solvent which lowers the solubility of the pigment in the presence of a dispersant, thereby precipitating and dispersing particles of the pigment in a mixed solvent, wherein a pigment derivative to which a hydrophobic substituent having affinity for the first solvent has been bonded is used as the pigment.

The present invention embraces an image forming process comprising forming an image with an ink composition comprising the pigment dispersion obtained by the preparation process of the pigment dispersion according to the present invention.

The present invention also embraces an image forming apparatus comprising a means for applying the above-described ink composition to a medium, thereby forming an image.

Further features of the present invention will become apparent from the following description of exemplary embodiments with reference to the attached drawing.

BRIEF DESCRIPTION OF THE DRAWINGS

The FIGURE is a block diagram illustrating the construction of an ink jet recording apparatus to which the image forming apparatus according to the present invention can be applied.

DESCRIPTION OF THE EMBODIMENTS

The present invention will hereinafter be described in detail.

The preparation process of a pigment dispersion provided by the present invention is a process for preparing a pigment dispersion, which comprises mixing a first solvent composed of an organic solvent in which a pigment has been dissolved with a second solvent which lowers the solubility of the pigment in the presence of a dispersant, thereby precipitating and dispersing particles of the pigment in a mixed solvent, wherein a pigment derivative to which a hydrophobic substituent having affinity for the first solvent has been bonded is used as the pigment.

The mechanism through which the fine particles of the pigment derivative are obtained in the dispersed state in the present invention is as follows. When the first solvent is mixed with the second solvent, the pigment derivative in a dissolved state in the first solvent is rapidly insolubilized to form particle nuclei. In the process of aggregation of the nuclei, the presence of the dispersant permits providing fine particles of the pigment derivative in a dispersed state.

Since pigments intrinsically have low solubility in solvents, the concentration of fine particles of the pigment contained in a liquid composition is low when the fine pigment particles are formed in accordance with such a process, and so a problem is caused on productivity.

In particular, phthalocyanine that is representative of cyan pigments is known to have extremely low solubility in solvents. It is thus very difficult to form fine particles of a phthalocyanine pigment at a practical concentration.

In order to obtain a liquid composition containing fine particles of the phthalocyanine pigment at a high concentration, it is necessary to make the solubility of the pigment in the first solvent as high as possible.

The present invention has a feature that a phthalocyanine pigment derivative to which a substituent having affinity for the first solvent has been bonded is used, thereby solving the problem of the solubility of the pigment in the first solvent to increase the concentration of the fine particles of the pigment derivative in a finally obtained pigment dispersion (liquid composition).

According to the present invention, there can be provided a preparation process of a pigment dispersion containing fine particles of a phthalocyanine pigment derivative, which have high size uniformity and are of the order of nanometer, at a high concentration and in a dispersed state.

The present invention can provide an ink composition for ink jet recording, which is suitably used as an ink which provides a print excellent in color developability.

The present invention can also provide an image forming method and an image forming apparatus using the above-described ink composition.

(Pigment Derivative)

The pigment derivative in the present invention has a feature that it has a substituent having affinity for the first solvent, whereby it is soluble in the first solvent.

In addition, when the pigment derivative is dissolved at a high concentration in the first solvent, the solubility of the pigment derivative in the first solvent can be enhanced by applying high-temperature and high-pressure conditions to the solvent. The pigment derivative in the present invention also has a feature that it is hardly-soluble in the second solvent.

In particular, the present invention can be suitably applied to phthalocyanine pigments that have been difficult to date to be pulverized at a high concentration due to the problem of the solubility, and particularly to metal phthalocyanine pigments, and more preferably a copper phthalocyanine pigment among these.

The pigment derivative is preferably a metal phthalocyanine derivative represented by the following formula (1):

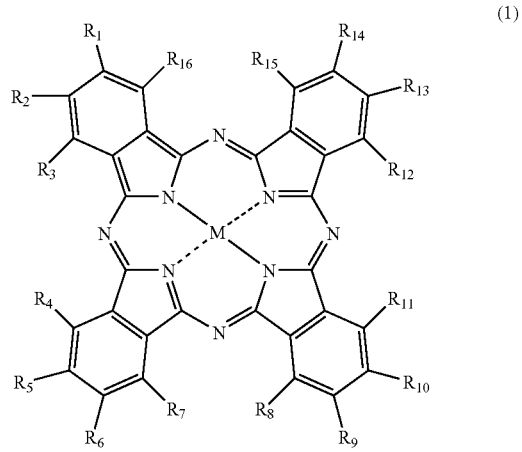

In the formula, M is a metal atom, and $R^1$ to $R^{16}$ are, independently of one another, a hydrogen atom or a substituent with the proviso that at least one of $R^1$ to $R^{16}$ is a substituent having affinity for the first solvent. M that is a metal atom is preferably, for example, copper, titanium, aluminum or iron.

$R^1$ to $R^{16}$ are, independently of one another, a hydrogen atom or a substituent, and examples of the substituent include hydrophobic substituents such as a tert-butyl group. At least one of the substituents is a substituent having affinity for the first solvent.

A copper phthalocyanine derivative when M in the general formula (1) is a copper atom is such a derivative that substituents are bonded to any of the sites of $R^1$ to $R^{16}$. In such a derivative, substituents are required to bond to least one site of $R^1$ to $R^{16}$ and may bond to all sites; besides, one substituent or plural kinds of substituents different from one another in chemical structure may be bonded.

The substituent in the present invention has a feature that it has a chemical structure having affinity for the first solvent, and has a chemical structure that improves the solubility of the copper phthalocyanine derivative in the first solvent. With respect to the substituent, that having any chemical structure may be used so far as the objects of the present invention can be achieved.

When the first solvent is an aprotic solvent and the second solvent is water or an aqueous solution as will be described in Examples, the substituent preferably has a chemical structure having hydrophobicity, and is preferably an alkyl or alkoxy group.

A particularly preferred result is yielded when the substituent is a tert-butyl group though the reason for it is not clearly known. It is however considered that when the substituent is a tert-butyl group, the solubility of the copper phthalocyanine derivative in the first solvent is improved, and moreover an effect to suppress the crystal-growth rate of the copper phthalocyanine derivative is brought about by the steric effect of the tert-butyl group as a secondary effect.

As a method for evaluating whether the copper phthalocyanine derivative is soluble or hardly-soluble in a solvent, any of publicly known methods may be used. In the present invention, the solubility of pigment derivatives in the solvent was evaluated in accordance with the following method. However, the method is not limited to this method so far as the objects of the present invention can be achieved.

A copper phthalocyanine derivative is mixed with the first solvent or the second solvent so as to give a concentration of 3% by mass, and the resultant mixtures are shaken for 24 hours and then left to stand for 24 hours. The copper phthalocyanine derivative is defined as being soluble where the mixture is present in a uniformly mixed state, or as being hardly-soluble where the mixture is present as an incomplete solution that shows a gel or particulate appearance or apparent turbidity. However, "hardly-soluble" in present invention includes a so-called insoluble state in which no interaction of the copper phthalocyanine derivative and the solvent is recognized.

When it is difficult to visually determine the solubility, the light scattering intensity of a liquid with the copper phthalocyanine derivative dissolved or dispersed therein is measured, whereby the measured value may be uses as an index of the solubility. In this case, the copper phthalocyanine derivative is defined as being soluble where the light scattering intensity is lower than 1,000 cps or as being hardly-soluble where the light scattering intensity is not lower than 1,000 cps.

The light scattering intensity can be measured in any publicly known method. In the present invention, scattering intensity measured by means of a dynamic light scattering photometer "DLS-7000" (manufactured by Otsuka Electronics Co., Ltd.) is used as an evaluation standard.

(Dispersant)

As the dispersant in the present invention, there may be suitably used that capable of achieving a dispersing effect on the fine particles of the pigment derivative, particularly on the fine particles of the copper phthalocyanine derivative. A surfactant or polymer compound whose hydrophilic moiety is at least one of carboxyl, sulfonic, phosphoric and hydroxyl groups, and alkylene oxide is preferably used.

The surfactant used as the dispersant may be suitably selected from conventionally known surfactants including anionic surfactants such as alkylbenzene-sulfonates, alkylnaphthalenesulfonate, higher fatty acid salts, sulfonic acid salts of higher fatty acid esters, sulfuric acid ester salts of higher alcohol ethers, sulfonic acid salts of higher alcohol ethers, alkylcarboxylic acid salts of higher alkylsulfonamides and alkylphosphates; nonionic surfactants such as polyoxyethylene alkyl ethers, polyoxyethylene alkyl phenyl ethers, polyoxyethylene fatty acid esters, sorbitan fatty acid esters, ethylene oxide adducts of acetylene glycol, ethylene oxide adducts of glycerol and polyoxyethylene sorbitan fatty acid esters; and besides amphoteric surfactants such as alkylbetaines and amidobetaines, silicon-containing surfactants, and fluorine-containing surfactants, and derivatives thereof.

Specific examples of the polymer compound used as the dispersant include block copolymers, random copolymers and graft copolymers composed of at least two monomers (at least one thereof being a monomer having a functional group of any of carboxyl, sulfonic, phosphoric and hydroxyl groups, and alkylene oxide) selected from styrene, styrene derivatives, vinylnaphthalene, vinylnaphthalene derivatives, aliphatic alcohol esters of α,β-ethylenically unsaturated carboxylic acids, acrylic acid, acrylic acid derivatives, methacrylic acid, methacrylic acid derivatives, maleic acid, maleic acid derivatives, alkenylsulfonic acids, vinylamine, allylamine, itaconic acid, itaconic acid derivatives, fumaric acid, fumaric acid derivatives, vinyl acetate, vinylphosphonic acid, vinylpyrrolidone, acrylamide, N-vinylacetamide, N-vinylformamide and derivatives thereof, and the like, and modified products and salts of these copolymers. Besides, natural polymer compounds such as albumin, gelatin, rosin, shellac, starch, gum arabic and sodium alginate, and modified products thereof may also be used.

These dispersants may be used either singly or in any combination thereof. No particular limitation is imposed on the proportion of the dispersant used. If the proportion thereof is not lower than 50 parts by mass per 100 parts by mass of the solvent, however, the dispersant is difficult to be completely dissolved. If the proportion is not higher than 0.05 part by mass, it may be difficult in some cases to achieve a sufficient dispersing effect on the fine particles of the pigment derivative.

(First Solvent)

The first solvent used in the present invention is preferably an aprotic solvent. In particular, as the first solvent, any solvent may be used so far as it has affinity for the substituent of the pigment derivative and can dissolve the pigment derivative, and the objects of the present invention can be achieved.

Specific examples of solvents preferably used include dimethyl sulfoxide, dimethylimidazolidinone, sulfolane, N-methylpyrrolidone, dimethylformamide, acetonitrile, acetone, dioxane, tetramethylurea, hexamethylphosphorylamide, hexamethylphosphoryltriamide, pyridine, propionitrile, butanone, cyclohexanone, tetrahydrofuran, tetrahydropyrane, ethylene glycol diacetate and y-butyrolactone. Among these, dimethyl sulfoxide, N-methylpyrrolidone, dimethylformamide, dimethylimidazolidinone, sulfolane, acetone, acetonitrile and tetrahydrofuran are preferred. These solvents may be used either singly or in any combination thereof.

No particular limitation is imposed on the proportion of the first solvent used. However, the first solvent is preferably used within a range of from 2 parts by mass to 500 parts by mass, more preferably from 5 parts by mass to 100 parts by mass per 1 part by mass of the pigment derivative. When the first solvent is used within this range, a better dissolved state of the pigment derivative and easy formation of fine particles having a desired particle size can be achieved, and the color density of a liquid composition containing the fine particles of the pigment derivative can be made better.

(Second Solvent)

As the second solvent used in the present invention, any solvent may be used so far as it has compatibility with the first solvent, and the objects of the present invention can be achieved. In particular, water or an aqueous solution is preferred. The second solvent preferably has an effect to lower the solubility of the pigment dissolved in the first solvent.

Additives can be contained in water or the aqueous solution. As the additives, any additives may be used so far as they are compatible with water or the aqueous solution, and the objects of the present invention can be achieved. For example, they include publicly known pH adjustors including alkalis and pH buffers, and salts. In order to enhance the compatibility of the first solvent with water or the aqueous solution, for example, an organic solvent such as an alcohol may also be contained.

(Additive)

Various kinds of additives may be added to the first solvent or second solvent for the purpose of enhancing the dispersion performance of the dispersant or improving the compatibility of the first solvent with the second solvent. Specifically, alkalis, methanol, ethanol and the like may be used.

In addition to the pigment derivative and the polymer compound, at least one of an ultraviolet absorbent, an antioxidant, a resin additive and the like may be added to the first solvent as needed.

Examples of the ultraviolet absorbent include ultraviolet absorbents such as metal oxides, aminobenzoate ultraviolet absorbents, salicylate ultraviolet absorbents, benzophenone ultraviolet absorbents, benzotriazole ultraviolet absorbents, cinnamate ultraviolet absorbents, nickel chelate ultraviolet absorbents, hindered amine ultraviolet absorbents, urocanic acid ultraviolet absorbents and vitamin ultraviolet absorbents.

Examples of the antioxidant include hindered phenol compounds, thioalkanic acid ester compounds, organic phosphorus compounds and aromatic amines.

Examples of the resin additive include synthetic resins such as anionically modified polyvinyl alcohol, cationically modified polyvinyl alcohol, polyurethane, carboxymethyl cellulose, polyester, polyallylamide, polyvinyl pyrrolidone, polyethylene imine, polyamine sulfone, polyvinyl amine, hydroxyethyl cellulose, hydroxypropyl cellulose, melamine resins and modified products thereof. All of these antioxidants, ultraviolet absorbents and resin additives may be used either singly or in any combination thereof.

(Mixing Method)

In order to obtain the fine particles of the pigment derivative, which have high size uniformity and are of the order of nanometer, the mixing of the first solvent with the second solvent is preferably conducted as quickly as possible. Any of the conventionally known devices used in stirring, mixing, dispersion and crystallization, such as an ultrasonic oscillator, a full-zone agitating blade, an internal circulation type stirring device, an external circulation type stirring device, and a flow rate and ion concentration controlling device may be used for the mixing.

The mixing may also be conducted in continuously flowing water. As a method for pouring the pigment solution into water, may be used any of the conventionally known liquid-pouring methods. However, it is preferable that the solution be poured into or fed onto water as a jet flow from a nozzle of a syringe, needle, tube or the like. Incidentally, the solution may also be poured from a plurality of nozzles for the purpose of completing the pouring in a short period of time.

The temperature of the solution upon the mixing of the first solvent with the second solvent affects the size of the organic pigment precipitated. Therefore, the temperature of the solution is preferably controlled within the range of from −50° C. to 500° C. more preferably from −30° C. to 100° C., still more preferably from −20° C. to 50° C. for the purpose of obtaining fine particles of the pigment derivative having a particle size of a nanometer order. In order to achieve good flowability of the solution at this time, a publicly known freezing point depressant such as ethylene glycol, propylene glycol or glycerol may be added to water to be mixed.

The average particle size of the resulting fine pigment derivative particles is desirably not greater than 100 nm, preferably not greater than 50 nm.

(Concentrating and Purifying Method)

The fine pigment derivative particles obtained by mixing the first solvent with the second solvent may be used as they are, and may be used in various application fields by concentrating and purifying them as needed.

For a concentrating and purifying method, there may be used any of the conventionally known devices used in concentration and purification, such as centrifugal separators, evaporators and ultrafilters.

(Ink Composition for Ink Jet Recording)

When the liquid composition according to the present invention is used as an ink composition for ink jet recording (hereinafter abbreviated as "the ink composition"), various additives, aids and the like may be added to the liquid composition as needed. A dispersion stabilizer for stably dispersing a pigment in a solvent is one of the additives. Although the fine pigment derivative particles contained in the liquid composition according to the present invention are stably dispersed by the polymer compound making up the fine pigment derivative particles, another dispersion stabilizer may also be added when dispersion is insufficient.

A resin having both hydrophilic part and hydrophobic part or a surfactant may be used as another dispersion stabilizer. Examples of the resin having both hydrophilic part and hydrophobic part include copolymers of a hydrophilic monomer and a hydrophobic monomer.

Examples of the hydrophilic monomer include acrylic acid, methacrylic acid, maleic acid, fumaric acid, monoesters of the carboxylic acids described above, vinylsulfonic acid, styrenesulfonic acid, vinyl alcohol, acrylamide and methacryloxyethyl phosphate. Examples of the hydrophobic monomer include styrene, styrene derivatives such as α-methylstyrene, vinylcyclohexane, vinylnaphthalene derivatives, acrylic acid esters and methacrylic acid esters. Copolymers of various forms such as random, block and graft copolymers may be used. It goes without saying that both hydrophilic monomer and hydrophobic monomer are not limited to those described above.

An anionic, nonionic, cationic or amphoteric surfactant may be used as the surfactant.

Examples of the anionic surfactant include fatty acid salts, alkyl sulfate salts, alkylarylsulfonic acid salts, alkyl diaryl ether disulfonic acid salts, dialkylsulfosuccinic acid salts, alkylphosphonic acid salts, naphthalenesulfonic acid-formalin condensates, polyoxyethylene alkylphosphate salts and glycerol borate fatty acid esters. Examples of the nonionic surfactant include polyoxyethylene alkyl ethers, polyoxyethylene-oxypropylene block copolymers, sorbitan fatty acid esters, glycerol fatty acid esters, polyoxyethylene fatty acid esters, polyoxyethylenealkylamines, fluorine-containing surfactants and silicon-containing surfactants.

Examples of the cationic surfactant include alkylamine salts, quaternary ammonium salts, alkylpyridinium salts and alkylimidazolinium salts. Examples of the amphoteric surfactant include alkylbetaines, alkylamine oxides and phosphatidyl choline. Incidentally, the surfactants are also not limited to those mentioned above.

Besides, an aqueous solvent may be added to the liquid composition according to the present invention as needed. When the liquid composition is used as an ink-jet ink in particular, the aqueous solvent is used for the purpose of preventing at orifices drying and solidification of the ink. Aqueous solvents may be used either singly or as a mixture thereof.

As the aqueous solvent, any of the resins having both hydrophilic part and hydrophobic part and surfactants described above may be used. However, the aqueous solvents are not limited thereto. When the liquid composition is used as an ink, the content of the aqueous solvent is within a range of from 0.1 to 60% by mass, preferably from 1 to 40% by mass based on the whole mass of the ink.

When the liquid composition is used as an ink, various additives may be used as other additives. Examples thereof include pH adjustors for achieving stabilization of the ink and obtaining stability of the ink to piping in a recording apparatus, penetrants for accelerating penetration of the ink into a recording medium to facilitate apparent drying and mildew-proofing agents for preventing occurrence of mildew in the ink.

Chelating agents for blocking metal ions in the ink to prevent deposition of metals at a nozzle portion and deposition of insoluble matter in the ink and antifoaming agents for preventing occurrence of foams upon circulation, transferring or preparation of the recording liquid may also be mentioned.

In addition, antioxidants, viscosity modifiers, conductivity-imparting agents and ultraviolet absorbents may also be added.

The ink composition can be prepared by mixing the liquid composition according to the present invention with the above-described components, and uniformly dissolving or dispersing them. When an excess amount of the polymer compound or additives are contained in the ink composition prepared, they may be suitably removed by a publicly known method such as centrifugal separation or dialysis to re-adjust the ink composition.

(Image Forming Process, and Liquid Application Method and Apparatus)

The composition according to the present invention can be used in various kinds of image forming methods such as various printing methods, ink-jet methods or electrophotographic methods as well as in various kinds of apparatus therefor, and an image can be formed by an image forming method using such an apparatus. When the liquid composition is used, the liquid composition may be used in a liquid application method for forming a minute pattern by an ink-jet method or for administering a drug.

The image forming process according to the present invention is a process for forming an excellent image with the composition according to the present invention. The image forming process according to the present invention is preferably an image forming process comprising ejecting the ink composition according to the present invention from an ink-ejecting part to apply it to a recording medium, thereby conducting recording. A process using an ink-jet method in which thermal energy is applied to an ink to eject the ink is preferably used for forming an image.

In the present invention, bleeding and/or feathering on a recording medium can be inhibited by using stimuli by a polyvalent cation in combination. When the polyvalent cation is present on the recording medium, the ink composition quickly undergoes aggregation, whereby an ink composition, a liquid application method and a liquid application apparatus, by which bleeding and/or feathering on a recording medium can be decreased, may also be provided.

Preferable Examples of the polyvalent cation include, as metal cations, divalent cations such as Ca, Cu, Mg, Ni, Zn, Fe and Co, and trivalent cations such as Al, Nd, Y, Fe and La. Examples of non-metal cations include a diammonium cation and a triammonium cation. However, the polyvalent cations are not limited thereto.

For a method for applying the polyvalent cation to a recording medium, a recording medium to which the polyvalent cation has been applied in advance may be used, or a method in which the polyvalent cation is shot throughout the whole region for forming an image by an ink-jet head may also be used.

As a method for applying stimuli, there may be applied various methods. As a preferred embodiment, a method for applying stimuli in the case where the stimuli are a polyvalent cation will be described. As described in, for example, Japanese Patent Application Laid-Open No. S64-063185, the polyvalent cation may be shot throughout the whole region for forming an image by an ink-jet head. It is also preferable that the polyvalent cation has been applied to the recording medium in advance.

For ink-jet printers using the ink composition for ink-jet according to the present invention, there may be applied various ink jet recording apparatus such as a piezo ink-jet system using a piezoelectric element and a Bubble-Jet (trademark) system in which thermal energy is applied to an ink to bubble the ink, thereby conducting recording.

This ink-jet recording apparatus is schematically described below with reference to the accompanying FIGURE. Incidentally, the FIGURE shows an example of constructions, which by no means limits the present invention. The FIGURE is a block diagram showing the construction of the ink-jet recording apparatus.

The FIGURE shows a case in which a head is moved to perform recording on a recording medium. As shown in the FIGURE, to a CPU 50, which controls the whole motion of the recording apparatus, an X-direction drive motor 56 and a Y-direction drive motor 58 which are to drive a head 70 in the X-Y directions are connected via an X-motor drive circuit 52 and a Y-motor drive circuit 54, respectively.

According to instructions from the CPU, the X-direction drive motor 56 and the Y-direction drive motor 58 are driven through the X-motor drive circuit 52 and the Y-motor drive circuit 54, respectively, and the head 70 is then positioned in respect to the recording medium.

As shown in the FIGURE, to the head 70, a head drive circuit 60 is connected in addition to the X-direction drive motor 56 and the Y-direction drive motor 58. The CPU 50 controls the head drive circuit 60 to drive the head 70, i.e., to eject an ink-jet ink.

To the CPU 50, an X-encoder 62 and a Y-encoder 64 are further connected which are to detect the positions of the head, and the positional information of the head 70 is inputted thereto. A control program is also inputted into a program memory 66.

The CPU 50 makes the head 70 move on the bases of this control program and the positional information sent from the X-encoder 62 and Y-encoder 64, and makes the head disposed at the desired position on the recording medium to eject the ink-jet ink. In this way, a desired image can be formed on the recording medium. Also, in the case of an image recording apparatus in which a plurality of ink-jet inks can be loaded, the operation as described above may be repeated given times in respect to the ink-jet inks, whereby the desired image can be formed on the recording medium.

After the ejection of the ink composition for ink-jet, the head 70 may also optionally be moved to a position where a removing means (not shown) for removing an excess ink adhered to the head is disposed, to clean the head 70 by wiping or the like. As a specific method for such cleaning, a conventional method may be used as it is.

After images have been formed, the recording medium on which the images have been formed is replaced by a new recording medium by way of a recording medium transporting mechanism not shown.

Incidentally, in the present invention, the above embodiment may be modified or transformed as long as such modification or the like does not cause deviation from the gist of the present invention. For example, in the foregoing description, an example is shown in which the head 70 is moved in the directions of X-, Y-axes. This head 70 may instead be so made as to move only the X-axis direction (or the Y-axis direction) and the recording medium may be moved in the Y-axis direction (or the X-axis direction), to form images while moving these interlockingly.

The present invention brings a superior effect on a head having a means for generating thermal energy (e.g., an electrothermal converter or a laser beam) as the energy utilized in order to eject the ink composition, and ejecting the ink composition by the action of the thermal energy. Such a system enables achievement of highly minute image formation. The use of the ink-jet ink compositions according to the present invention enables much superior image formation.

As to typical construction and principles of the apparatus having such a means for generating thermal energy, preferred are those which perform recording by using fundamental principles as disclosed in, for example, U.S. Pat. Nos. 4,723,129 and 4,740,796. This system is applicable to either what are called an On-Demand type or a continuous type. In particular, the On-Demand type is effective because at least one driving signal which corresponds to recording information and gives a rapid temperature rise exceeding nuclear boiling is applied to an electrothermal converter arranged correspondingto a liquid path, in which a liquid is retained, thereby causing the electrothermal converter to generate thermal energy to cause film boiling on the heat-acting surface of a head, so that a bubble can be formed in the liquid in response to the driving signal in relation of one to one. The liquid is ejected through an ejection opening by the growth-contraction of this bubble to form at least one droplet. When the driving signal is applied in the form of a pulse, the growth-contraction of the bubble is suitably conducted in a moment, so that the ejection of the liquid excellent in responsiveness in particular can be achieved. It is therefore preferable to use such pulsed signals. As the pulsed driving signal, such signals as described in U.S. Pat. Nos. 4,463,359 and 4,345,262 are suitable. When the conditions described in U.S. Pat. No. 4,313,124 which discloses an invention relating to the rate of temperature rise on the heat-acting surface are used, far excellent ejection can be conducted.

As the construction of the head, such combined constructions (linear liquid flow path or perpendicular liquid flow path) of ejection openings liquid flow paths and electrothermal converters as disclosed in the above-described U.S. patents, and besides the construction based on U.S. Pat. Nos. 4,558,333 and 4,459,600 which disclose the construction in which a heat-acting portion is arranged in a curved region may also be included in the present invention. The construction based on Japanese Patent Application Laid-Open Nos. S59-123670 and 59-138461 may also be effective for the present invention. In other words, ejection of the ink-jet ink can be efficiently performed with certainty according to the present invention even when the type of the head is any type.

Further, in the image forming apparatus according to the present invention, the present invention can be effectively applied to a full-line type head having a length corresponding to the longest width of recording media. Such a head may have either the construction that satisfies the length by a combination of plural heads or the construction of one head integrally formed.

In addition, the present invention is effective even in a serial type when a head is fixed to an apparatus body or when a replaceable chip type head, in which electrical connection to an apparatus body and the feed of an ink from the apparatus body become feasible by installing the head in the apparatus body, is used.

Further, the apparatus according to the present invention may additionally have a droplet removing means. When such a means is added, a far excellent ejecting effect can be realized.

Besides, addition of preliminary auxiliary means and the like which are provided as a constituent element of the apparatus according to the present invention is preferred because the effects of the present invention can be more stabilized. As specific examples thereof, may be mentioned capping means for the head, pressurizing or sucking means, preliminary heating means for conducting heating by using electrothermal converters, other heating elements than these or combinations thereof, and preliminary ejecting means for conducting ejection other than ejection of an ink.

In the present invention, the above-described film boiling system is most effective.

The amount of an ink-jet ink ejected from each ejection orifice of the ejection head in the apparatus according to the present invention is preferably within a range of from 0.1 to 100 picoliters.

The ink compositions according to the present invention may also be used in indirect recording apparatus using a recording system in which an ink is applied to an intermediate transfer member, and the applied ink is then transferred to a recording medium such as paper, or the like. Further, the ink compositions may also be applied to apparatus making good use of an intermediate transfer member with a direct recording system.

EXAMPLES

The present invention will hereinafter be described more specifically by the following Examples. However, the present invention is not limited to these examples.

Example 1

Forty parts by mass of polyoxyethylene lauryl ether (product of Kishida Chemical Co., Ltd.; Brij 31) was dissolved in 100 parts by mass of tetrahydrofuran. In this solution was dissolved 10 parts by mass of copper tert-butylphthalocyanine [copper(II) 2,9,16,23-tetra-tert-butyl-29H,31H-phthalocyanine] while stirring for 2 hours in a container. This pigment solution was quickly poured by means of a syringe into distilled water under stirring by means of a stirrer while conducting an ultrasonic treatment, thereby precipitating fine particles of copper tert-butylphthalocyanine [copper(II) 2,9,16,23-tetra-tert-butyl-29H,31H-phthalocyanine].

The average particle size of the resultant pigment dispersion was measured by means of a dynamic light scattering spectrophotometer "DLS-7000" (manufactured by Otsuka Electronics Co., Ltd.). As a result, it was found to be 30.3 nm.

Example 2

The same procedure was performed as in Example 1 except that the pigment derivative was changed from copper tert-butylphthalocyanine [copper(II) 2,9,16,23-tetra-tert-butyl-29H,31H-phthalocyanine] to copper octyloxy-phthalocyanine [copper(II) 2,3,9,10,16,17,23,24-octakis(octyloxy)-29H,31H-phthalocyanine], thereby precipitating fine particles of copper octyloxy-phthalocyanine [copper(II) 2,3,9,10,16,17,23,24-octakis(octyloxy)-29H,31H-phthalocyanine].

The average particle size of the resultant pigment dispersion was measured by means of a dynamic light scattering spectrophotometer "DLS-7000" (manufactured by Otsuka Electronics Co., Ltd.). As a result, it was found to be 44.2 nm.

<Preparation of Ink Composition>

Tetrahydrofuran was removed from a liquid composition containing the fine pigment derivative particles prepared in Example 1 by using a permeable membrane (product of SPECTRUM Laboratories Co., molecular porous membrane tubing (MWCO:3500)). A concentrated liquid having a pigment content of 10% was obtained by additionally using an evaporator.

Fifty parts by mass of this concentrated liquid containing the fine pigment derivative particles, 7.5 parts by mass of diethylene glycol, 5 parts by mass of glycerol, 5 parts by mass of trimethylolpropane, 0.2 part by mass of Acetylenol EH and 32.3 parts by mass of ion-exchanged water were mixed to prepare an ink composition.

<Evaluation as to Printing>

The ink composition prepared was charged into an ink jet printer BJF 800 (trade name, manufactured by Canon Inc.) to conduct ink jet recording of a solid-printed image on plain paper. The resultant recorded article was visually evaluated. As a result, it was confirmed that the article has a bright hue.

According to the present invention, there can be provided a liquid composition containing the fine particles of the phthalocyanine pigment derivative, which have high size uniformity and are of the order of nanometer, at a high concentration and in a dispersed state. This liquid composition can be utilized in an ink composition for ink jet recording, which is suitably used as an ink which provides a print excellent in color developability, and in an image forming process and an image forming apparatus using the ink composition.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2006-053939, filed Feb. 28, 2006, which is hereby incorporated by reference herein in its entirety.

What is claimed is:

1. A process for preparing a pigment dispersion, which comprises mixing a first solvent composed of an organic solvent in which a pigment has been dissolved with a second solvent which lowers the solubility of the pigment in the presence of a dispersant, thereby precipitating and dispersing particles of the pigment in a mixed solvent, wherein a pigment derivative to which a hydrophobic substituent having affinity for the first solvent has been bonded is used as the pigment, wherein the pigment derivative is a metal phthalocyanine derivative represented by the following formula (1):

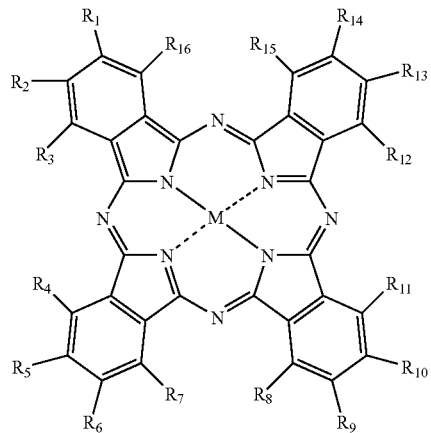

wherein M is a metal atom, and $R^1$ to $R^{16}$ are tert-butyl groups.

2. The preparation process according to claim 1, wherein the metal phthalocyanine derivative is copper phthalocyanine.

3. The preparation process according to claim 1, wherein the first solvent is an aprotic solvent.

4. The preparation process according to claim 1, wherein the second solvent is water or an aqueous solution.

5. An ink composition for ink jet recording, comprising the pigment dispersion prepared in accordance with the process according to claim 1.

6. An image forming process comprising the step of applying the ink composition according to claim 5 to a medium, thereby forming an image.

* * * * *